United States Patent [19]

Goodson

[11] Patent Number: 4,671,473
[45] Date of Patent: Jun. 9, 1987

[54] AIRFOIL
[76] Inventor: Kenneth W. Goodson, Rte. 4, Box 389, Mt. Olive, N.C. 28365
[21] Appl. No.: 669,350
[22] Filed: Nov. 8, 1984
[51] Int. Cl.⁴ .......................... B64C 5/08; B64C 23/06
[52] U.S. Cl. ..................................... 244/199; 244/46; 244/218
[58] Field of Search ................. 244/46, 49, 199, 90 R, 244/218, 130

[56]  References Cited
U.S. PATENT DOCUMENTS 1,466,551  8/1923  Thurston ........................... 244/90 R
1,888,418  11/1932  Adams ............................... 244/90 R
3,270,988  9/1966  Cone, Jr. ............................. 244/199
3,712,564  1/1973  Rethorst ............................. 244/199
4,172,574  10/1979  Spillman ............................. 244/199

Primary Examiner—Galen Barefoot
Attorney, Agent, or Firm—Mills & Coats

[57]  ABSTRACT

This invention is an improved airfoil in the form of a plurality of controllable winglets which are used to reduce the stall characteristics of wing tips and to give them better lift capabilities. This is accomplished through relatively simple and yet highly efficient controls.

9 Claims, 10 Drawing Figures

AIRFOIL

FIELD OF INVENTION

This invention relates to aircraft and more particularly to the airfoils used in conjunction therewith.

BACKGROUND OF INVENTION

Since the Wright Brothers first proved that heavier than air aircraft are feasible, man has worked on improving the performance of the same.

One of the problems encountered has been that high speed performance has been at the sacrifice of low speed performance and vice versa. Aircraft that perform well at high speed have a proportionally higher landing and stall speed while aircraft that perform well at low speed and have slow stall characteristics are incapable of high speed.

One of the attempted solutions to the above-indicated problem has been the development of swing wing aircraft which extend their wings during relatively low speed and partially retracted the same during high speed.

The expense of manufacturing the highly sophisticated structural means to support the swing wing as well as the complicated controls required to operate the same effectively prices this concept out of all except the supersonic jet aircraft market.

More specifically, all finite lifting surfaces such as aircraft wings, canards, horizontal tails and the like experience a flow phenomena at their tips known as the roll-up of tip vorticies. These vorticies occur throughout the angle of attack range from the lowest angle up to the highest where flow separation and surface stall occurs, especially in the region of the tips. The strength of these vorticies increases as the angle of attack and surface loading increases.

Tip vorticies are formed when high pressure air acting on the lower surface of the lifting structure tends to flow spanwise toward the tip and into the ambient low pressure area outside the tip. This spanwise flow tends to spill up and around the tip and back into the low pressure area behind the lifting surface, thus forming a tip vortex. Energy is lost at the formation and shedding of these tip vorticies. The tip vorticies also produce an upwash at the tips which causes high angles of attack at such tips resulting in early tip stall and associated energy losses.

Roll up of air flow at the tips represents a considerable loss of energy into the air stream which manifests itself as a reduction in lift accompanied by large increases in drag, especially when flow separation and stall occurs and in fact at stall angles of attack or angles near stall, these effects can be quite severe. For example, on aircraft which normally take off and land at high angles of attack, tip stalls can occur resulting in catastrophic losses in lift, large increases in power required, and in severe stability and control problems.

Over the years, various devices and design techniques have been used to help overcome some of these problems. One traditional method of delaying or moderating tip stall is the use of negative twist or wash out on wings and other lifting surfaces. Surface wash out reduces the angle of attack at which the tip airfoil sections operate thus allowing the tip areas to stall later than does the inboard area.

Another technique or method used to improve the tip flow characteristics is the use of end plates mounted vertically on the tips of the lifting surfaces to block or impede the spanwise air flow thus reducing the strength of the tip vorticies and thereby improving the tip stall characteristics. This flow blockage effectively increases the aspect ratio of the lifting surface which in itself improves the lift and drag characteristics. Although currently several aircrafts are achieving some success with end plates mounted vertically on their wing tips, this has certainly not proved to be a complete answer to the problem.

BRIEF DESCRIPTION OF INVENTION

After much research and study into the above-mentioned problems, the present invention has been developed to use a different technique that does not block the spanwise flow but delays or prevents tip stall and absorbs energy from the up wash of the swirling tip vorticies. This new design effectively recovers energy from the tip vorticies throughout the angle of attack range, particularly at high angles of attack where stall and flow separation normally occurs.

The above energy recovery process is accomplished through the use of a plurality of slat/flap winglets located at the tip chord plane of the lifting surface more or less in cascade fashion across the tip chord. The slat/flap winglets extend from approximately the ninety percent span station out to the surface tip. The slat/flap winglets serve two basic purposes or functions, first to improve the tip stall characteristics which saves energy and secondly to recover some of the energy normally lost in the tip vorticies. Additionally the slat/flap winglets also add considerable aesthetic value to an aircraft. This new tip design can be applied to any finite lifting surface such as wings, canards, and horizontal tail sections.

In order for the slat/flap winglets to improve the stall characteristics of the lift surface, the slat/flaps themselves must remain essentially aerodynamically unstalled. To achieve this the winglets are twisted from their root chords out to their tips to an optimum pitch angle relative to the local flow streamlines and are fixed to the lifting surface in the tip chord plane at their nominal design pitch angle. The winglets are designed to have good airfoil shapes with air flow gaps between their trailing edge lower surfaces and their nose upper surfaces much like that found for slotted flaps on some aircraft wings. Further the winglets are tapered from their root chords out to their tips to provide a degree of tip flow relief.

For operation at angles of attack outside the normal design boundaries, the slat/flap winglets are made controllable in pitch angles so they can be adjusted relative to the local streamlines to keep the winglets unstalled. With pitch controllable slat/flap winglets, aircraft wings for example can be aerodynamically controlled even at deep stall angles of attack such as can be encountered in steep descents. On lift structures operating at low angles of attack, i.e., high speed, the winglet air flow gaps can be closed to keep drag to a minimum. At higher angles of attack, i.e., near stall, they can be opened to the pitch angle best suited to the particular operating condition.

To achieve a second type of energy recovery with the slat/flap winglets, i.e., energy recovery from the up-wash of the tip vorticies, the tips of the winglets are staggered relative to each other outwardly toward the basic surface tip. This spanwise staggering causes the trailing winglet tips to extend approximately the winglet chord length beyond the tip of the winglet immediately in front thus allowing the up-wash from the leading winglet tip vortex to flow up and across the extended tip of the immediately trailing winglet thereby absorbing some of the energy from said leading winglet tip vortex. This improves both the lift and drag characteristics of the trailing winglet and for some flow conditions, produces a tip thrust. The tip staggering process is repeated for each of the trailing winglets. Energy recovered from the winglet tip vorticies is possible through the entire angle of attack range whenever there is a tip vortex.

Again, it is important that the winglet local airfoil section remains unstalled through use of good twist design and through proper winglet pitch angle control settings. It should also be mentioned that a small amount of negative twist or washout of the basic planform enhances the energy recovery process by better positioning the winglet tips relative to each other. Also the natural aeroelastic properties of the slat/flap winglets can be utilized to improve the winglets stall and pitch-stability characteristics. It is of interest to note that breaking up of the normal or conventional single tip vortex into several smaller vortices tends to keep the winglet aerodynamic centers of pressure confined to the chord length of each winglet thus minimizing the overall aerodynamic center travel at the tip.

It has been determined that various degrees of sophistication of the slat/flap winglets are possible. This sophistication varies from simple lifting devices including slat/flap winglets that are stamped or molded into the planforms as part of the overall structure to highly sophisticated lifting surfaces operating over a wide angle of attack range including slat/flap winglets which are controllable in pitch so that they can be adjusted to the proper geometric pitch angle necessary to match the local streamlines and keep the winglets unstalled.

On aircraft and other devices flying or operating at high speed and low angles of attack, the winglet air flow gaps can be closed to minimize drag. At higher angles of attack and slower speeds, the winglets can be opened in pitch angle with trailing edges up and larger air gaps to the optimum angle needed for a given flight or operating condition. Also the trailing edge slat/flap winglet can be used as an aileron for roll control. If desired, other winglets can also be incorporated into the control system.

The slat/flap winglets of the present invention can be controlled through use of linkages and control rods or cables running into the cabin or they can be controlled remotely through use of electrical servos, hydraulic motors, and the like. These slat/flap winglets can be used on aircraft wings and control surfaces such as canards and horizontal tails.

A third use of the slat/flap winglets is to increase the lifting surface area at the planform tip. Starting with the basic slat/flap winglet configuration, the winglets can be skewed or swept out in a fan-like manner resembling the unfolding of a Japanese fan. The tips of the winglets can be pivoted horizontally around a point in their root chords to form the fan like arrangement. When fanned out, the tip planform area is considerably increased. On the other hand when the winglets are completely retracted or closed, the tip panel reverts to essentially a solid or conventional lifting-surface tip. Skewing the winglets in a sweep or fan-like manner while maintaining the pitch control option presents mechanical design complexities; however, these complexities can be met when the application warrants the same. If, of course, only a larger fan out planform area is desired, the slat/flap winglets can simply be designed around that configuration without the retracting tip feature.

In view of the above, it is an object of the present invention to provide slat/flap winglets that do not block spanwise flow but delay or prevent tip stall by absorbing energy from the up-wash of the swirling tip vorticies.

Another object of the present invention is to provide a plurality of slat/flap winglets that can remain aerodynamically unstalled while the primary lift means is in such condition.

Another object of the present invention is to provide a plurality of slat/flap winglets which are controllable relative to pitch for optimum flow streamlines.

Another object of the present invention is to provide a plurality of slat/flap winglets which are sweepingly controllable for greater lift characteristics.

Another object of the present invention is to provide a plurality of slat/flap winglets which are controllable both as to pitch and sweeping movements to provide even greater aerodynamic control.

Another object of the present invention is to provide a plurality of slat/flap winglets which can be closed for high speed, low angle of attack flight and can be opened by controlling the pitch thereof at slower speeds and higher angles of attack to greatly reduce or eliminate stall at the tip of the primary lift surface.

Other objects and advantages of the present invention will become apparent and obvious from a study of the following description and the accompanying drawings which are merely illustrative of such invention.

DETAILED DESCRIPTION OF INVENTION

With further reference to the drawings, the slat/flap winglets of the present invention, indicated generally at 10, are operatively mounted on the tips of lift surfaces such as the wings 11, the canards 11' and horizontal stabilizers 12 of aircraft 13.

Although in some applications, as discussed above, the winglets 10 can be fixedly mounted on the outer edges of the lift surfaces indicated generally at 14. The most advantageous mounting is of the general type disclosed in FIG. 2 wherein each of the slat/flap winglets 10 are pitch controllable. As to the number of slat/flap winglets, these can vary from a minimum of two, to six or more depending on the specific application.

Figure 1:
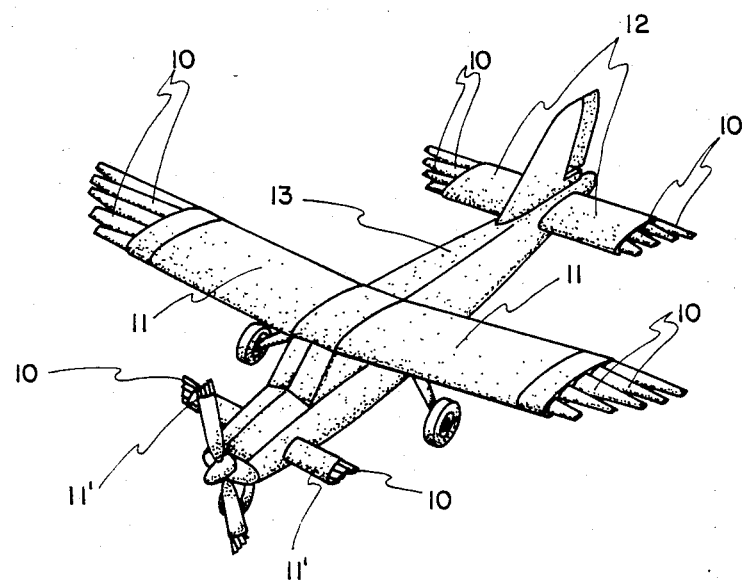
FIG. 1 is a perspective view showing the slat/flap winglets of the present invention operatively associated with primary lift surfaces of an aircraft.
Figure 2:
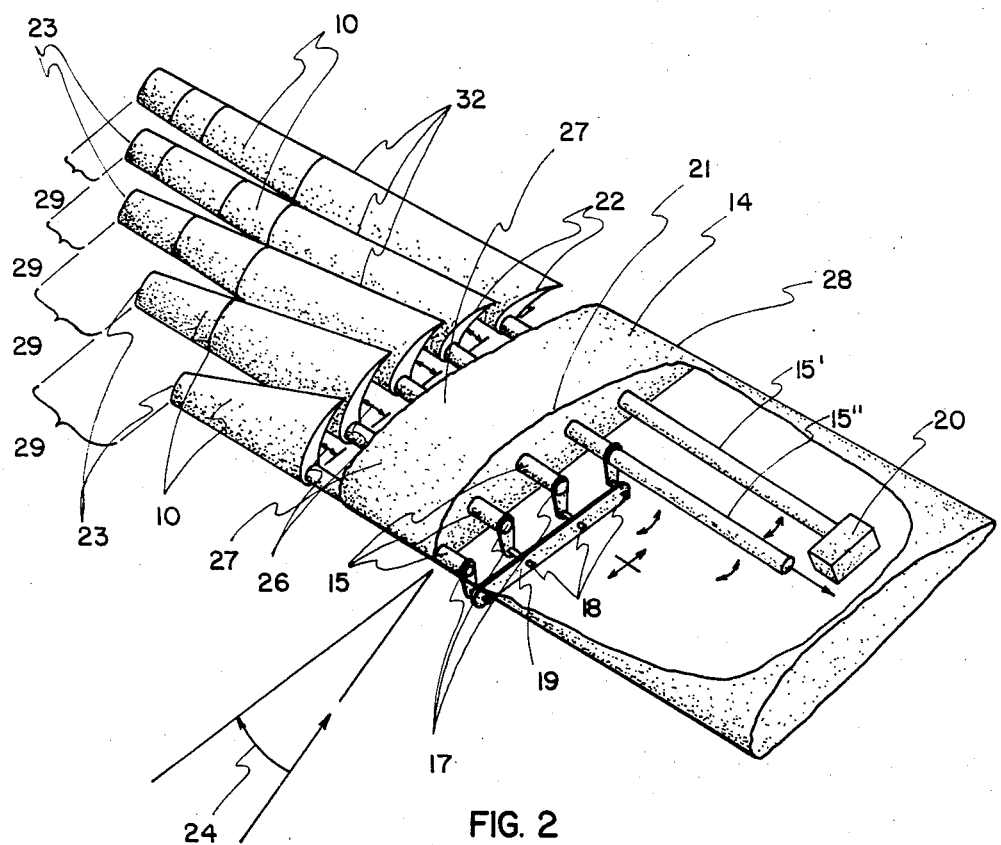
FIG. 2 is a perspective view of a typical slat/flap winglet configuration on the tip of a basic lift surface.

The somewhat exploded view shown in FIG. 2 includes a plurality of slat/flap winglets 10 that are fixedly secured to winglet control spars 15. When the winglets 10 are of the noncontrollable type, they are set at their optimum nominal pitch angle 26 relative to the adjacent lifting surface 14 with the spars 15 acting as the fixed connector.

For more sophisticated lifting surface 14 which operate over a large angle of attack range, the winglets 10 can be controllable so that their pitch can be adjusted to match the local flow angles and streamlines. In the present sense, the pitch angle 26 is the angle between the winglet airfoil chord line and the adjacent lift surface chord line.

When pitch controllable slat/flap winglets are used, the winglet control spars 15 project through and are rotatively mounted on the outermost chordwise structural member or rib 16 of lift surface 14. The interior end of at least a portion of the control spars 15 have fixedly secured thereto lever arms 17. These lever arms are pivotably connected as indicated at 18 to a control linkage 19. The respective lengths of the various lever arms can vary thus allowing greater angles of pitch in the winglets adjacent the leading edge 27 of the lift structure 14 relative to the winglets adjacent the trailing edge 28 thereof. This difference in the angle of pitch can readily be seen by comparing FIG. 8 with FIGS. 5 through 7.

From the above it can be seen that by using an extended control spar 15', the plurality of interconnected winglets can be controlled in a master-slave relationship by simply rotating said extended spar. Also in some applications it is desirable to operate in one or more of the winglets individually such as the trailing winglet so that the same will act as an aileron or flap. In this case the extended control spar 15" is operated separately without any interconnecting linkages.

The extended control spars can either extend into the cabin area where they can be rotated or they can be remotely controlled by means such as electric or hydraulic servo motors 20 or similar means. Since remote control means of this type are well known to those skilled in the art, further detailed discussion of the same is not deemed necessary.

Figure 5:
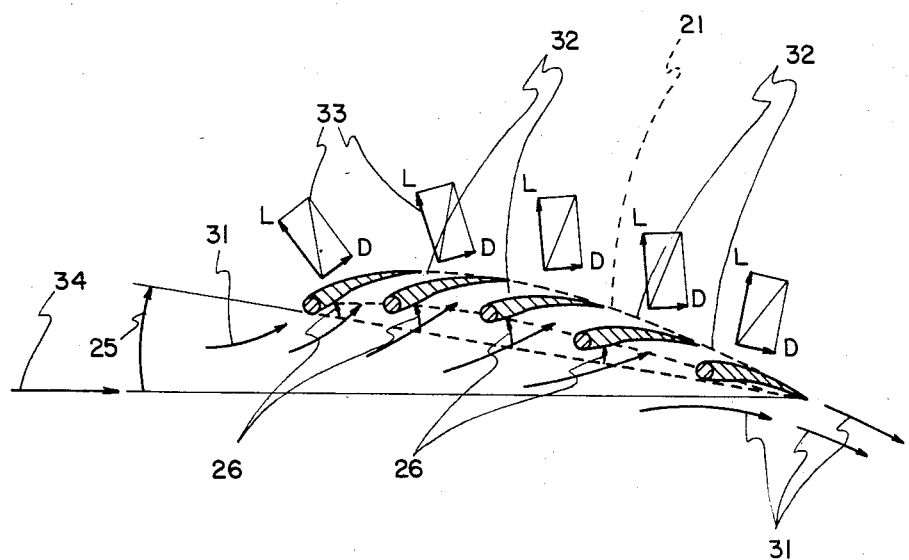
FIG. 5 is a sectional view through the lifting surfaces at the inboard ends of the slat/flap winglets showing their root-chord airfoil shapes and the air gaps.
Figure 6:
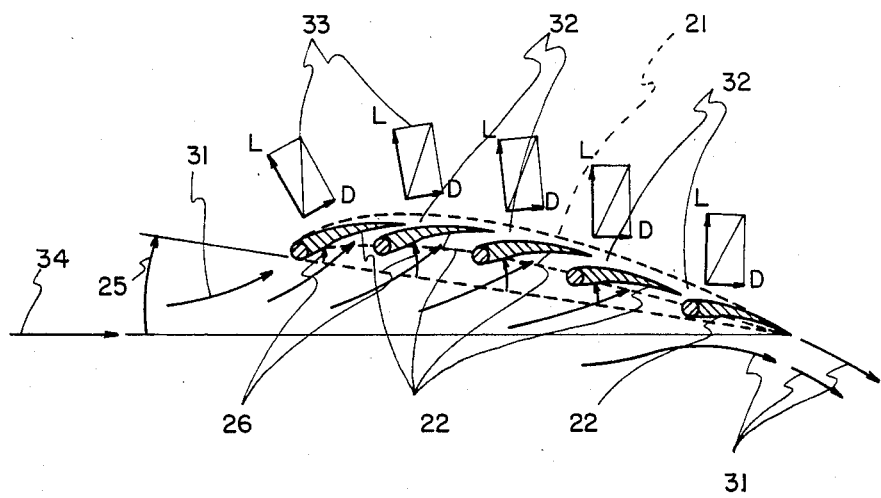
FIG. 6 is a sectional view of the slat/flap winglets showing the tip airfoil shapes and the angles of attack and the air gaps as they relate to the root-chords shown in FIG. 5.

The slat/flap winglets 10 are designed to fit essentially within the airfoil contour 21 of the basic wing or other lift surface 14. Each of these slat/flap winglets are tapered from their root-chords 22 out to their tip chords 23. The winglets are also given an optimum twist from their root-chords 22 to their chord tips 23 to match the local flow angles encountered at their design angle of attack 24. Comparison of FIGS. 5 and 6 shows the effect of the spanwise taper and twist on the chord lengths, the pitch angles 26, and the air-flow gaps 32.

For reference purposes, the leading edge of the lift surface 14 is indicated at 27. Also the lifting surface angle of attack 24 is measured relative to the free-stream velocity 34. The basic arrangement of slat/flap winglets improves the tip stall characteristics of the lifting surface thus improving both the lift and drag characteristics and reduces the amount of energy lost in the airstream.

As mentioned above, optimized slat/flap winglets can be fixed to the basic lift surface 14 at their nominal design pitch angles 26. For operation at angles of attack 25 outside of the design angle of attack 24 of lift surface 14 (see FIGS. 7 and 8), such winglets must be controllable in pitch 26 as indicated to allow such winglets to be adjusted relative to local flow streamlines in order to keep said winglets 10 aerodynamically unstalled.

In addition to improving the stall characteristics of finite lifting surfaces, the slat/flap winglets 10 can also further reduce the amount of energy lost at the tip vortices. This is accomplished by spanwise staggering the winglet tips consecutively longer from leading edge 27 to trailing edge 28 of lift surface 14 as can clearly be seen in FIGS. 1 through 4. It should be noted that the distances of staggering of the winglets from leading edge to trailing edge of the lift surface 14 is progressively narrower as indicated at 29.

Figure 3:
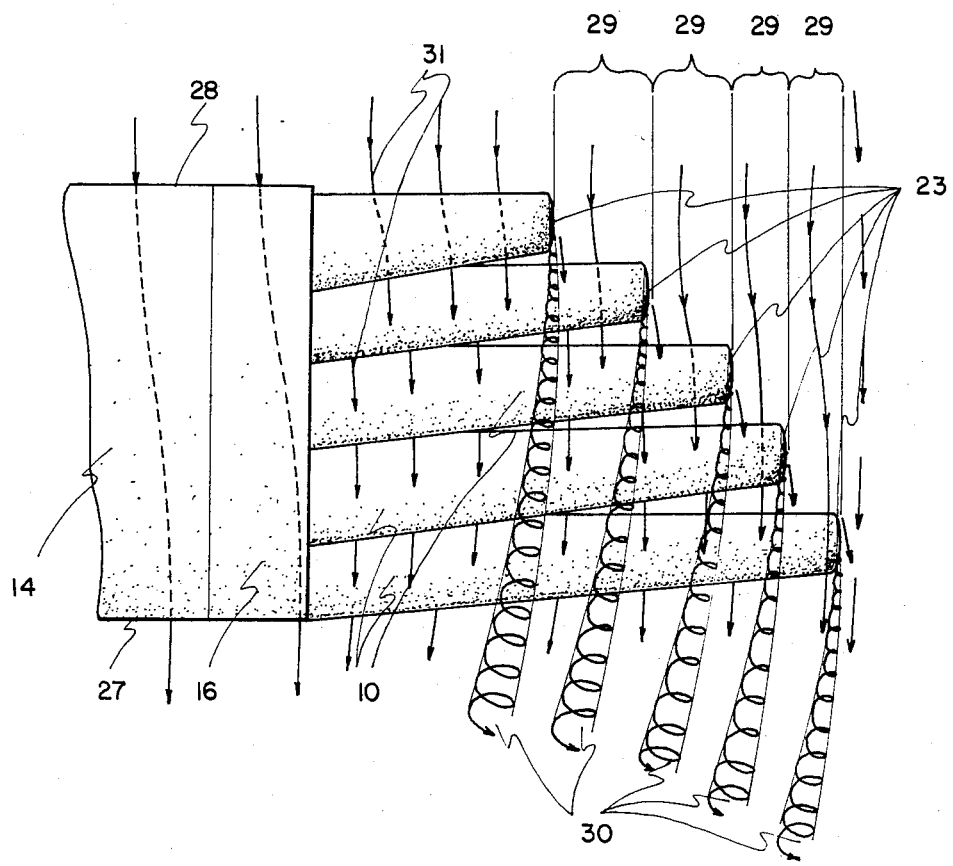
FIG. 3 is a plan view of a typical slat/flap winglet configuration showing the vorticies shed from each winglet tip.
Figure 4:
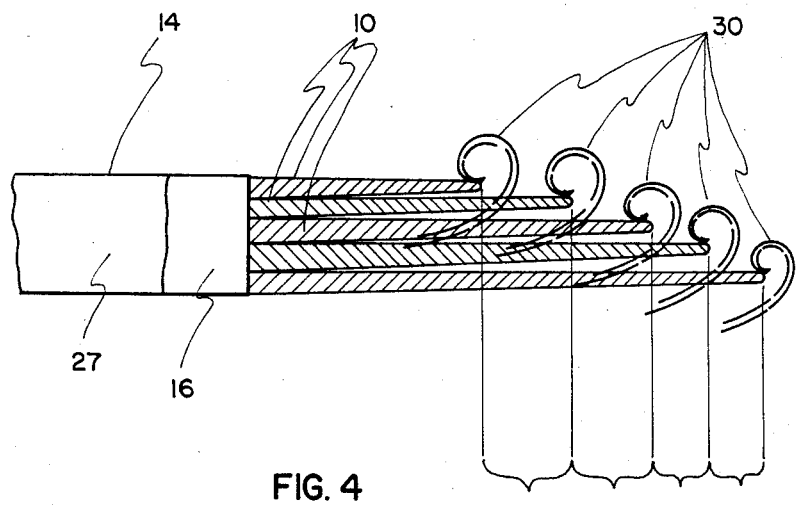
FIG. 4 is a front elevational view of a typical slat/flap winglet configuration at an angle of attack depicting the roll up of the winglet tip vorticies.

The purpose of the staggering of the winglet tips across the chord of the lift surface 14 is to allow each adjacent rearward winglet to absorb energy from the up-wash of the winglets forward thereof as shown in FIGS. 3 and 4.

FIG. 3 also shows the spanwise staggering 29 of the winglet tips and the general location and distribution of the tip vorticies 30 as they flow from the tip of each winglet. The arrows 31 show basically the path of the streamlines up through the gaps and over the surface of each of the respective trailing winglets.

FIG. 4 further illustrates the up-wash from the tip vortices 30 and their relationship to the staggered winglet tips 29. It should be noted that FIGS. 5 and 6 illustrate cross sections through the winglet root-chords 22 and winglet tip chords 23, respectively, as they relate in cross section to the airfoil contour 21 of lift surface 14. These two figures show the normal air flow 31 through the air gaps 32 between adjacent slat/flap winglets. Also typical lift-drag vectors acting on each winglet are illustrated at 33.

Figure 7:
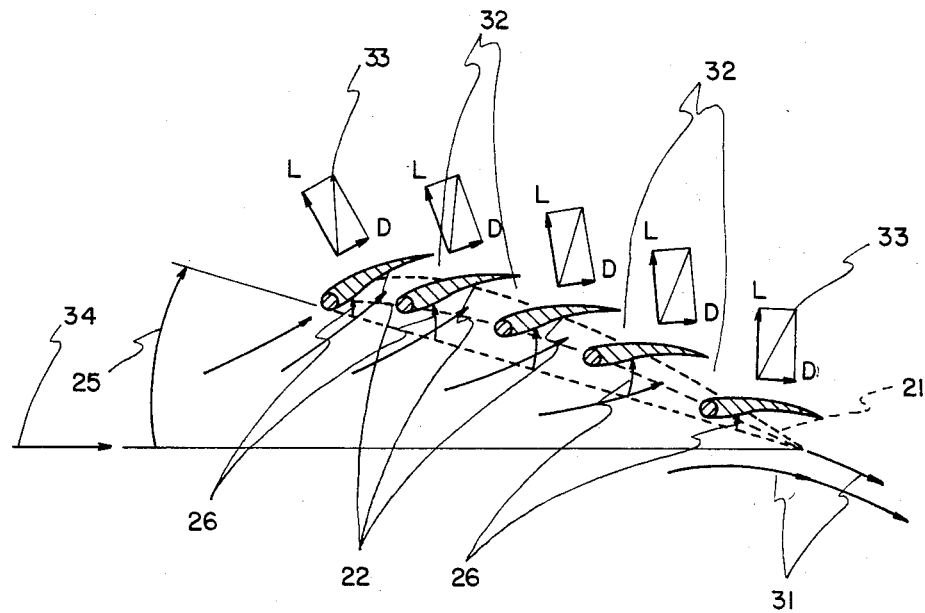
FIG. 7 is a sectional view showing the slat/flap winglets opened to a large pitch angle for slow speed flight.

FIG. 7 shows in a somewhat schematic form the slat/flap winglets opened to a large negative pitch angle 26 with the trailing edges up and large air gaps 32 therebetween as is required at lift surface angles of attack near stall to keep the winglets themselves from stalling. It should be noted that the winglet trailing edges in FIG. 7 have moved outside of the basic airfoil contour 21 of surface 14. It should also be noted that for a given pitch angle the position of any given winglet's trailing and leading edge relative to the basic contour 21 of lift surface 14 can vary depending upon where the control spars 15, 15' or 15" are located along the chord lines of said winglets.

Figure 8:
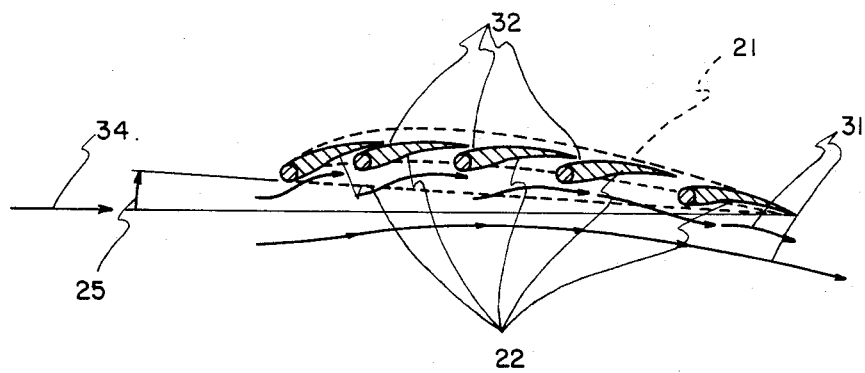
FIG. 8 is a sectional view showing the slat/flap winglets closed to a high speed, low angle of attack with the gaps therebetween closed.

FIG. 8, on the other hand, is a cross section taken through the root-chords 22 of winglets 10 showing the air gaps 32 therebetween completely closed. This configuration can be used for high speed, low angle of attack operating conditions since it maintains a low drag co-efficient.

Figure 9:
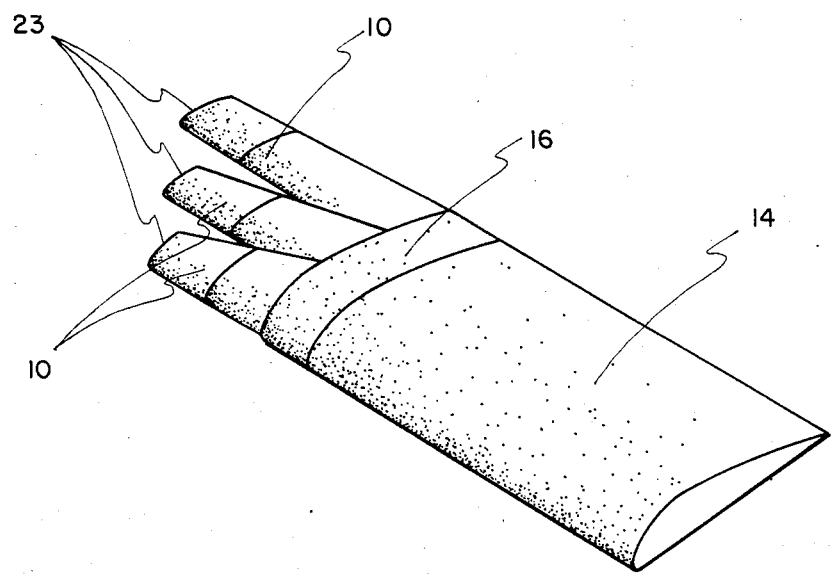
FIG. 9 is a perspective view of a three slat/flap winglet configuration.

Although five winglets have been illustrated and discussed in FIGS. 2 through 8, the same basic principles apply to lesser or more winglets such as the three winglet form shown in FIG. 9.

Figure 10:
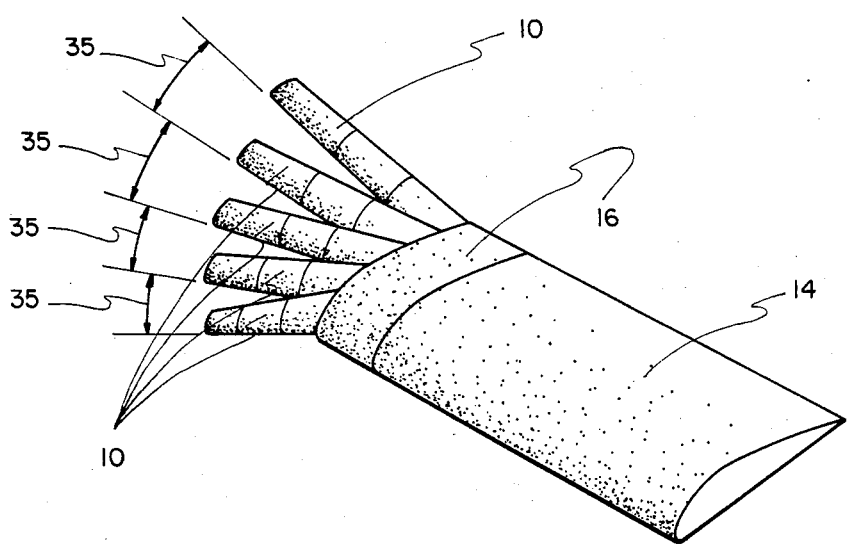
FIG. 10 is a perspective view of the slat/flap winglets in sweep configuration.

If desired, the slat/flap winglets 10 can be used to increase the effective tip planform area by sweeping the winglets in a chord plane in a manner similar to an unfolding of a Japanese fan. As illustrated in FIG. 10, the tip planform area and the tip air flow gaps are increased when the winglets are swept outwardly relative to each other. This winglet sweep configuration can be either fixed or controllable. In this latter instance, once the need for the extra lift in the open, swept configuration has passed, the winglets can be moved back into the unswept position shown in FIG. 2 and, if the air gaps are closed as shown in FIG. 8, then high speed, low angle of attack operations can be conducted in the conventional manner. Since means for imparting sweeping motion to the winglets is well within the ability of those skilled in the art, further detailed description of this feature of the present invention is not deemed necessary.

From the above it can be seen that the present invention has the advantage of providing a relatively simple and yet highly efficient means for improving the stall characteristics of lift surfaces while at the same time not creating undue drag during high speed, low angle of attack operation. The present invention has the additional advantage of providing a means for preventing tip stall of a lift surface even though the surface itself may be in a deep stall condition. These advantages are accomplished through the provision of slat/flap winglets outwardly extending from the basic lift surfaces, preferably in staggered configuration and including pitch angle control means.

The present invention can, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An improved lifting surface comprising: a plurality of airfoil shaped winglets mounted spanwise along the outer tip portion of said lifting surface such that the leading edges of said winglets are generally normal to the free air stream; said winglets being tapered from their root chords to their tip chords to provide a degree of tip flow relief; said winglets being staggered outward in a spanwise direction such that the tip of each trailing winglet extends beyond the tip of each leading winglet whereby each trailing winglet will absorb energy from the wing tip vortex of each leading winglet resulting in increased lift and reduced drag.

2. The improved lifting surface of claim 1 wherein the distance of the staggering of adjacent winglet tips is approximately equal to the chord length of the immediately forward winglet whereby both the lift and drag characteristics of the trailing winglet is improved and tip thrust can be produced.

3. The improved lifting surface of claim 1 wherein at least three winglets are mounted spanwise along the plane of the tip chord of said lifting surface.

4. The improved lifting surface of claim 1 wherein at least five winglets are mounted spanwise along the plane of the tip chord of said lifting surface.

5. The improved lifting surface of claim 1 wherein said winglets are fixedly mounted along the plane of the tip chord of said lifting surface to give improved stall characteristics.

6. The improved lifting surface of claim 1 including means for mechanically controlling said winglets relative to said lifting surface whereby at high speeds and low angles of attack, the air flow gaps between the winglets can be closed to minimize drag, and at slower speeds and higher angle of attacks, the air gaps between the winglets can be opened for optimum installed winglet lift.

7. The improved lifting surface of claim 6 wherein the winglet control means is a pitch control.

8. The improved lifting surface of claim 1 wherein said winglets are sweep controllable whereby the tip planform area can be increased.

9. The improved lifting surface of claim 1 wherein said winglets are both pitch controllable and sweep controllable whereby tip stall characteristics can be improved and tip planform lift area increased.

* * * * *